(12) United States Patent
Valembois

(10) Patent No.: US 8,327,511 B2
(45) Date of Patent: Dec. 11, 2012

(54) FIXING DEVICE FOR THE ASSEMBLY AND QUICK RELEASE OF OBJECTS

(75) Inventor: Guy Valembois, Toulouse (FR)

(73) Assignee: Conseil et Technique, Toulouse (FR)

( * ) Notice: Subject to any disclaimer, the term of this patent is extended or adjusted under 35 U.S.C. 154(b) by 189 days.

(21) Appl. No.: 12/937,365

(22) PCT Filed: Apr. 15, 2009

(86) PCT No.: PCT/FR2009/050701
§ 371 (c)(1),
(2), (4) Date: Oct. 15, 2010

(87) PCT Pub. No.: WO2009/138625
PCT Pub. Date: Nov. 19, 2009

(65) Prior Publication Data
US 2011/0030178 A1    Feb. 10, 2011

(30) Foreign Application Priority Data

Apr. 16, 2008  (FR) ........................ 08 52584
Aug. 14, 2008  (FR) ........................ 08 55573

(51) Int. Cl.
*F16B 21/00*    (2006.01)
(52) U.S. Cl. ............ 24/603; 24/683; 24/686; 244/173.3
(58) Field of Classification Search ................ 24/603, 24/115 R, 71.1, 910, 132 R, 115 F; 74/501.5 R; 244/173.3
See application file for complete search history.

(56) References Cited

U.S. PATENT DOCUMENTS 5,282,709 A * 2/1994 Chaput et al. ............. 411/433
6,073,914 A * 6/2000 Roth et al. ............... 254/29 A
6,433,990 B1 * 8/2002 Rudoy et al. .............. 361/160

FOREIGN PATENT DOCUMENTS

FR    2 756 619 A     6/1998
FR    2756619 A1 *    6/1998

* cited by examiner

*Primary Examiner* — James Brittain
(74) *Attorney, Agent, or Firm* — Andrew W. Chu; Craft Chu PLLC

(57) ABSTRACT

The fixing device for the assembly and quick release of objects includes a holding element that can be fixed to one of the objects to be held together, and a retaining device that can be fixed to another one of the objects to be held together and engage the holding element. The retaining device includes a plurality of separable parts that can be held closely together around the holding element by a disengageable pre-tensioning device. The separable parts are connected to each other by an elastically deformable mechanisms which stretch to in order to draw the parts located at a distance from each other together, while the pre-tensioning device includes a link wound around the parts in order to keep them closed on the holding element, at least one end of the link being fixed to a tensioning mechanism.

9 Claims, 6 Drawing Sheets

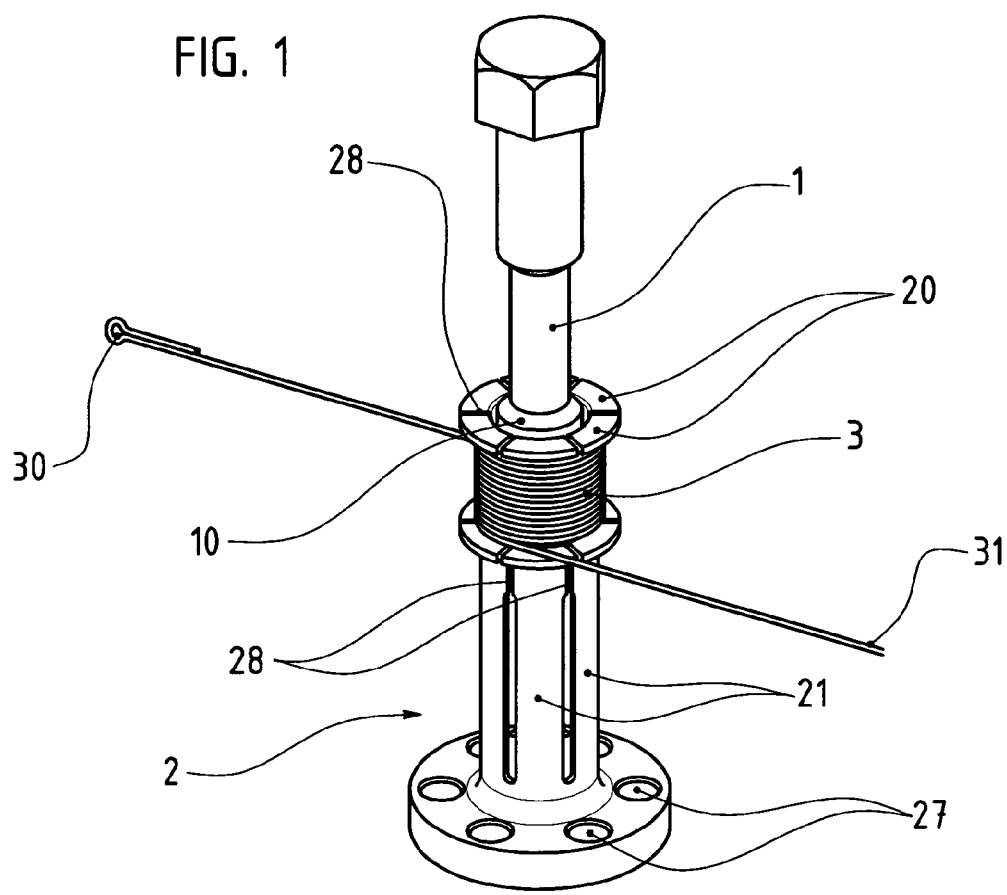
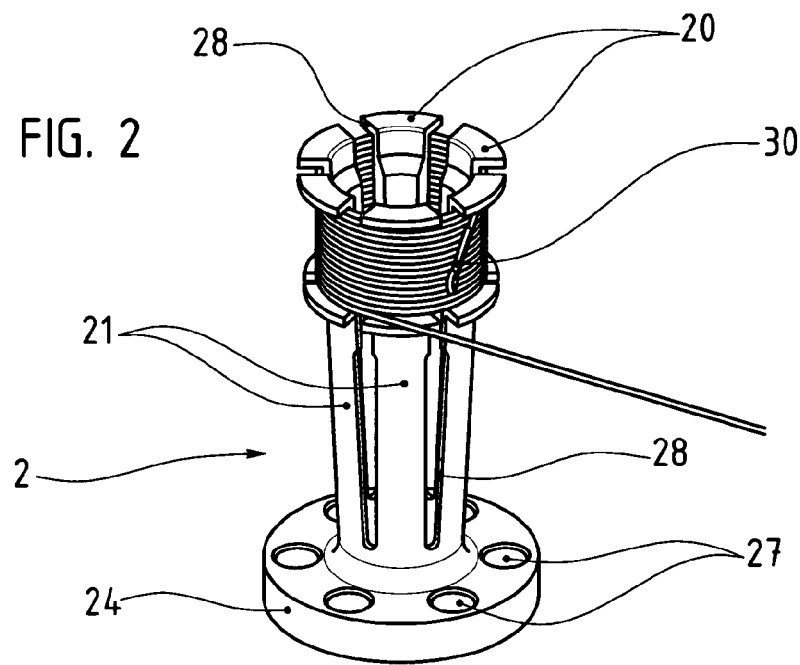

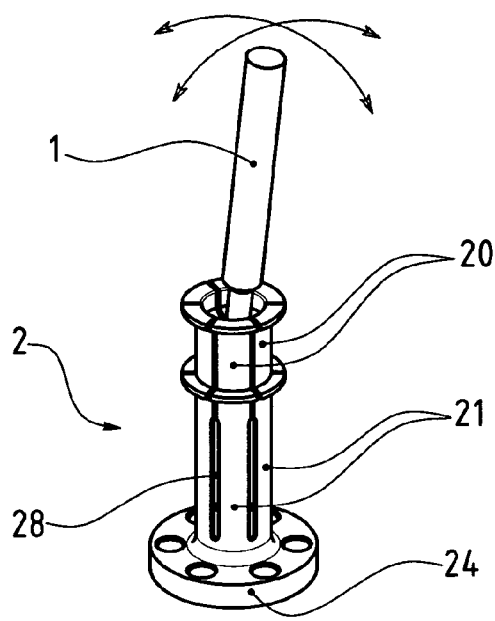
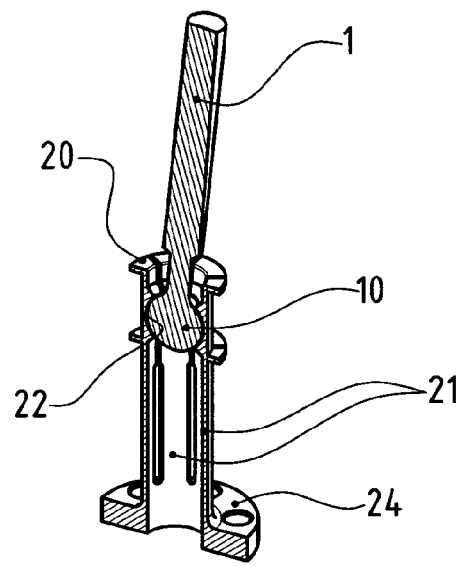
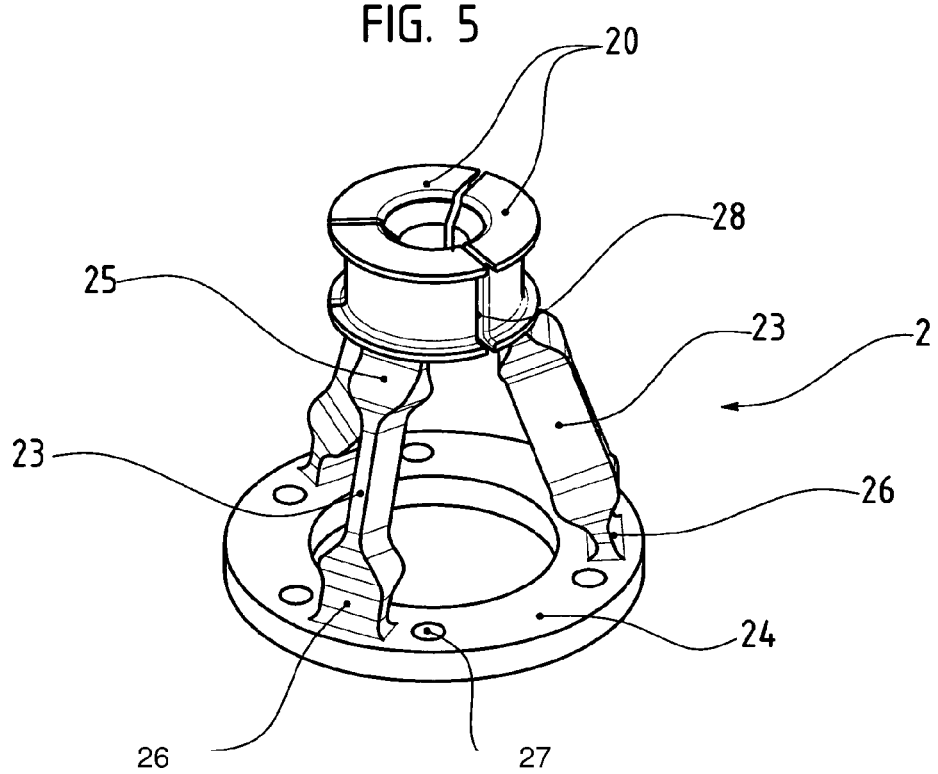

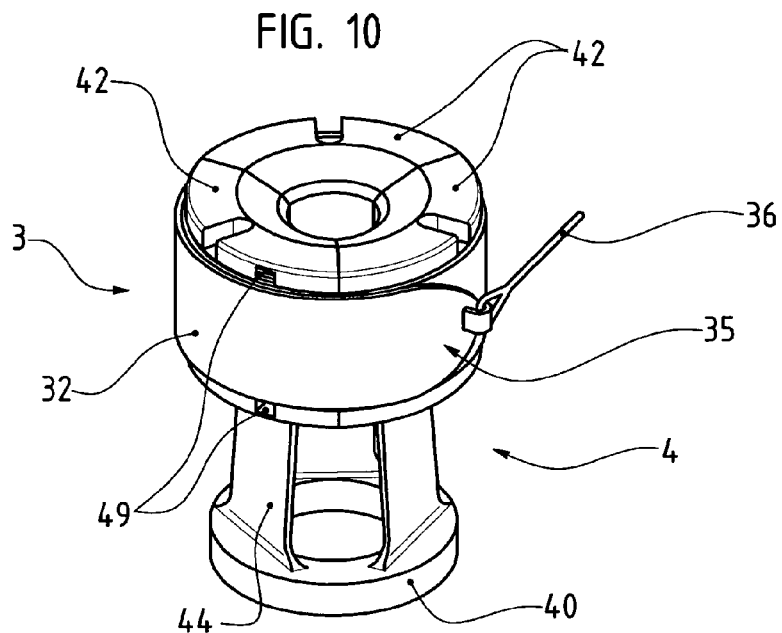
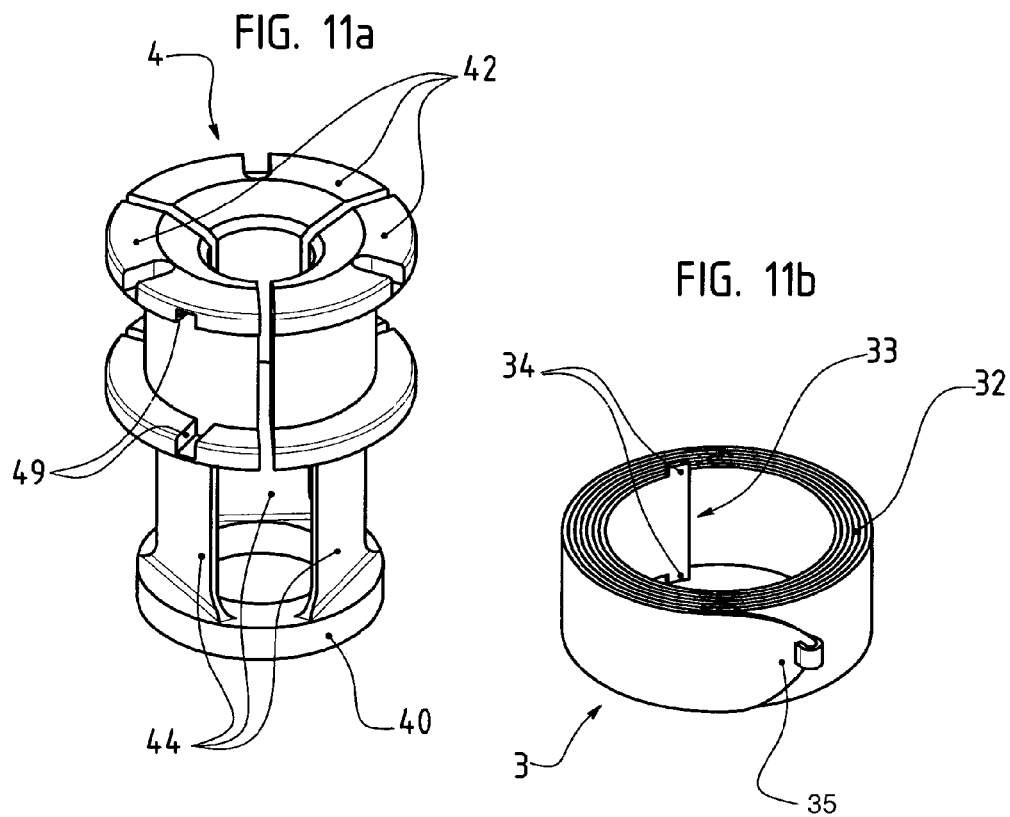

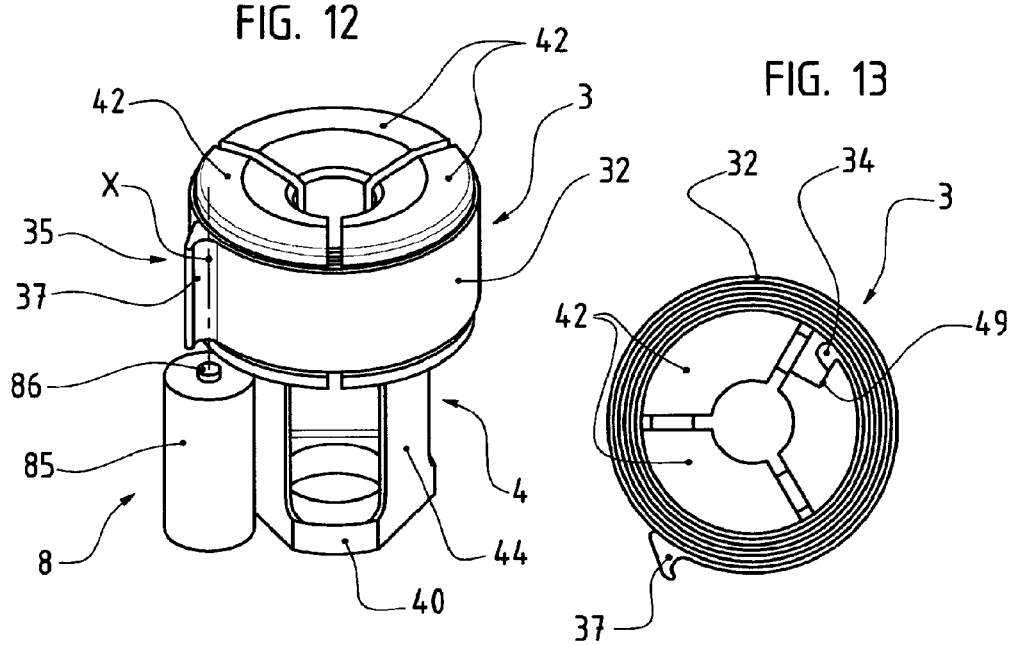
FIG. 12
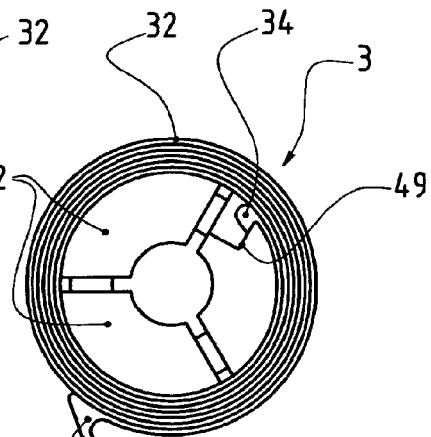
FIG. 13
FIG. 14a
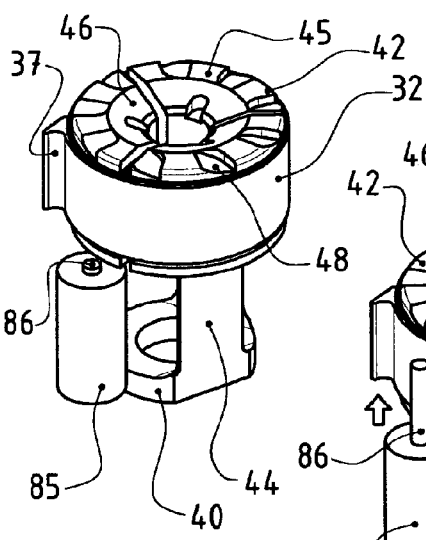
FIG. 14b
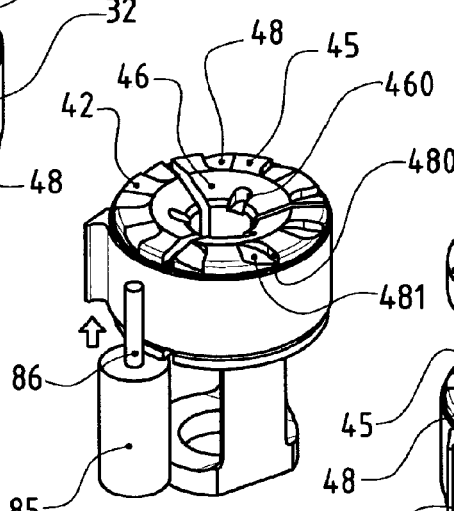
FIG. 14c
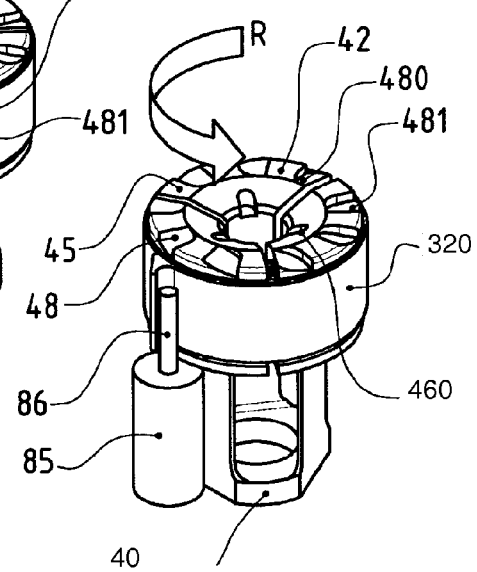

FIXING DEVICE FOR THE ASSEMBLY AND QUICK RELEASE OF OBJECTS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a fixing device for assembling objects, then quickly releasing them, and which comprises to this end, on the one hand, an attaching element that can be made integral with one of the objects to be held together and, on the other hand, retaining means that can be made integral with the other object and configured so as to hold, before the release, said holding element, said retaining means being formed of bringing closely together, around a securable part of said holding element, several separable parts held close together by disengageable pre-tensioning means.

2. Description of Related Art Including Information Disclosed Under 37 CFR 1.97 and 37 CFR 1.98

Fixing devices of this type are already known, which find an application essentially in the field of space navigation, where they are used for stacking appendices onto satellites, for example the solar-energy generators. In launching position, the folded appendices are fixed by means of fixing devices. After launching, these fixing devices are activated, which results into releasing the attaching means and into permitting the unfolding of the appendices of the satellite.

The disengaging of the pre-tensioning means generally occurs pyrotechnically, which has the drawback of causing impacts in the structure of the satellites or of their appendix, these impacts being due either to the pyrotechnical operation or to the sudden release of the potential energy accumulated by the tension on the parts of the retaining means.

In order to cope with these drawbacks, there has been proposed that the disengageable pre-tensioning means consist of a wire wound around the separable parts, wherein wire is fully or partially fusible, so as to permit the separation of said separable parts.

Thus, FR 2 756 619 shows a releasing device, which comprises, on the one hand, a retaining nut integral with one of the objects to be held together and formed of two parts, one pivotally mounted onto the other one that is fixed, so as to be able to separate from the latter under the action of a spring and thus open and, on the other hand, a rod the end of which is threaded, integral with another one of the objects to be held together, said parts, which have an inner thread, are maintained tightened onto said threaded end, in order to maintain it under pre-tension by means of a wire wound around them, the ends of said wire being maintained by fusible wires under the action of an electric voltage.

Such a device has the drawback that only the pivoting part can separate during the release and that, therefore, the disengagement of the threaded end requires not only the pre-tensioning, but also a displacement in the transversal direction of said threaded end with respect to the fixed part of the retaining nut, which, depending on the field of application, can be detrimental to the displacement of the objects after the release. Furthermore, when there exists a tension between the two objects, the release can produce an unwanted, or uncontrolled, displacement, of the objects with respect to each other.

EP 1 255 675 describes a fusible actuator with redundant current-supply, which comprises retaining means formed of a plurality of parts maintained tightened around the head of a securing pin by a retaining wire wound around said parts and an end of which is fusible under the action of an electric voltage. It should be noted that such a device has the drawback of a possible escape of the parts with the risk of damaging the objects to be held together.

SUMMARY OF THE INVENTION

The present invention is also aimed at coping with the above-mentioned drawbacks by providing a mechanical fixing device permitting a release while neutralizing the impacts induced by the release of the potential pre-tensioning energy, and of a simpler design than those of the devices described in the above-mentioned documents that permits their miniaturization while permitting developments that offer additional functionalities.

The fixing device according to the invention, which is used for assembling objects, then for releasing them quickly, comprises, on the one hand, a holding element that can be integral with one of the objects to be held together and, on the other hand, retaining means that can be integral with the other object and configured to retain, before the release, said holding element, said retaining means being formed by bringing close to each other, around a securable part of said holding element, several separable parts held close to each other by disengageable pre-tensioning means. It is essentially characterized in that, on the one hand, said separable parts consist of parts of said retaining means, connected to each other through elastically deformable means that tend to restore all said parts at their distance from each other and, on the other hand, said pre-tensioning means consist of an element forming a link wound around said parts so as to maintain them closed onto said holding element and at least one end of which is fixed to a mechanism for maintaining a tension exerted onto this link, which comprises means permitting to release this tension on request.

During the release, all the separable parts separate from the attaching element, which is instantaneously free, without any other movement whatsoever being necessary.

According to a particular embodiment, the retaining means consists of a clamp in the form of a globally tubular element and in which are provided for partial longitudinal slots forming petals that have springy properties permitting to restore the ends of said petals at their distance with respect to each other, which ends constitute the separable parts, when they are not subjected to the action of the pre-tensioning means.

Such a clamp can consist, namely when it is of a small size, of a single-piece part, or of the assembling of several elements.

According to an additional feature of the fixing device according to the invention, the portion of the holding element aimed at being clamped between the separable parts and the areas of the latter aimed at entering into contact with said holding element have complementary profiles capable of ensuring a retaining when said separable parts are subjected to the pre-tensioning.

Depending on the final use of the fixing device, the complementary profiles can have different forms.

It is thus possible that the holding element has at its end a spherical, or partially spherical, element, while the separable parts of the retaining means define, when they are maintained close to each other, a spherical cavity capable of retaining said spherical element, and even of permitting it to move in rotation and, hence, of permitting a relative pivoting of said holding element.

According to a variant, the end of the holding element is threaded and the separable parts of the retaining means define, when they are maintained close to each other, a threaded cavity permitting the screwing-in of said threaded end.

According to another feature of the fixing device according to the invention, the retaining means can be connected to one of the objects to be attached through means capable of ensuring several degrees of freedom of one object with respect to the other one, while preserving a high rigidity in translation in the axial direction.

According to a particular embodiment of the fixing device according to the invention, the retaining means includes a plate aimed at being fixed to one of the objects to be assembled, and which the elastically deformable means are made integral with, through hinged areas.

According to another particular embodiment of the fixing device according to the invention, the retaining means is maintained applied against the object, which it can be made integral with, through an interface permitting a swiveling motion of said object with respect to the holding element.

According to an additional feature of this other particular embodiment of the fixing device according to the invention, the aggregate of the separable parts of the retaining means maintained close to each other, has, at the end, a cavity having the shape of a spherical cap perforated in the center of the cavity aimed at accommodating the holding element, while the interface consists of a washer having an edge shaped so as to pivotally cooperate with said cavity against which it rests, while the opposite edge remains, directly or indirectly, resting flat against the object, which said retaining means is made integral with.

The link can consist of a spring-quality steel rod, a metal cable or any properly sized rope. One end of this link is fixed to a mechanism for maintaining and releasing the exerted tension, while the other one is made integral with a fixed element, eventually the retaining means itself, or to a mechanism identical to the above-mentioned one.

The operation of the fixing device according to the invention is as follows: the end of the holding element is placed between the separable parts of the retaining means, the link is wound around it in one or several layers, in order to bring said parts close to each other said parts, then it is fixed to the maintaining and releasing mechanism.

It should be noted that the number of spires, conjugated with the angle of inclination of the thread, in the case of fixing by means of a threaded assembling, can guarantee a very large ratio between the assembling tension and the maintaining tension.

When the maintaining and releasing mechanism releases the link, or the tension exerted onto the latter, the clamp opens and releases the holding element.

It should be noted that advantageously the low maintaining tension that is necessary permits an easy dimensioning and miniaturization of the maintaining and releasing mechanism.

In the event, the fixing device, according to the invention, is used in the space-navigation industry. A mechanism can be provided for that is capable of releasing or severing the link at its two ends, or twice at one of its ends, by doubling the mechanism dedicated to this function. This possibility thus permits to create the operation redundancy.

In the case of a number of winding layers of the link onto the upper pulley larger than one and of a link made out of a material having plastic characteristics, the unwinding of the link will occur per layer. Thus, from a certain percentage of unwinding, the strength of the link, maintained by adhesion and the Euler effects, will no longer be sufficient and will result into a lengthening of the link due to plastic deformation. This effect will permit a slight initial opening of the clamp, which will release the pre-tensioning of the holding element, thus eliminating the potential energy accumulated in the threaded element and, hence, the impact induced by its sudden release.

The maintaining and releasing mechanism can operate in various ways and consist for example, non-restrictively, of a trigger with an electromagnet, a heating resistance bringing about the fusion of a polymeric link, a pyrotechnical micro-mechanism.

In a particular embodiment, the releasing mechanism is formed of a rotary knife the pivoting of which is motorized by means of an initially pre-tensioned spring. A finger, axis of an electromagnet, maintains the knife in its stand-by position. A second axis coupled to a flame permits to guarantee the safety functions during the mounting, locking of the mechanism during the phases of electrical connections, locking of the mechanism without the electromagnet function, manual tests of the device.

The spring is geometrically arranged so as to considerably reduce its maintaining force, while guaranteeing a cutting efficiency. To this end one will act on the lever arm of the force of the spring.

According to an additional feature of the device according to the invention, the contact between the retaining means and the object, which it can be made integral with, occurs through an interface shaped into a ratchet system, and said retaining means includes means permitting its driving in axial rotation so that a rotation in the opposite direction of the winding-up of the link while the free end is blocked permits to bring the separable parts of the retaining means close to each other.

According to an advantageous embodiment of the fixing device according to the invention, the link is in the form of a ribbon, made out of metal or a composite or synthetic material, wound onto itself so as to be spirally shaped and having spring characteristics, the end of which, on the side of the inner spire is made integral with one of the separable parts of the retaining means, while the other end, on the side of the outer spire is, after winding up of said ribbon onto said retaining means around said separable parts, made integral with the maintaining mechanism.

According to an additional feature of the device according to the invention, the maintaining mechanism consists of trigger with an electromagnet capable of cooperating with the free end of the ribbon, which is shaped so as to be capable of being attached to said trigger.

The advantages and the features of the fixing device according to the invention will become clear from the following description, which refers to the attached drawing that represents several non-restrictive embodiments of same.

BRIEF DESCRIPTION OF THE DRAWINGS

FIG. 1 represents a schematic and perspective view of a fixing device according to the invention.

FIG. 2 represents a schematic and perspective view of part of a fixing device, in a different phase of use.

FIG. 3 represents a schematic and perspective view of a variant of the fixing device.

FIG. 4 represents a median longitudinal cross-sectional view of the same variant of FIG. 3.

FIG. 5 represents a schematic and perspective view of part of another variant.

FIG. 7b represents a partial schematic and perspective view of part of the same mounting of FIG. 7a.

FIG. 10 represents a schematic and perspective view of another embodiment of the fixing device according to the invention.

FIGS. 11a and 11b represent schematic and perspective views of parts of this other embodiment of the device.

FIG. 12 represents a schematic and perspective view of a variant of the embodiment shown in FIG. 10.

FIG. 13 represents a schematic and cross-sectional view of FIG. 12.

FIGS. 14a, 14b and 14c represent schematic and perspective views of another variant of the embodiment shown in FIG. 10, in different phases of use.

DETAILED DESCRIPTION OF THE DRAWINGS

Figure 6:
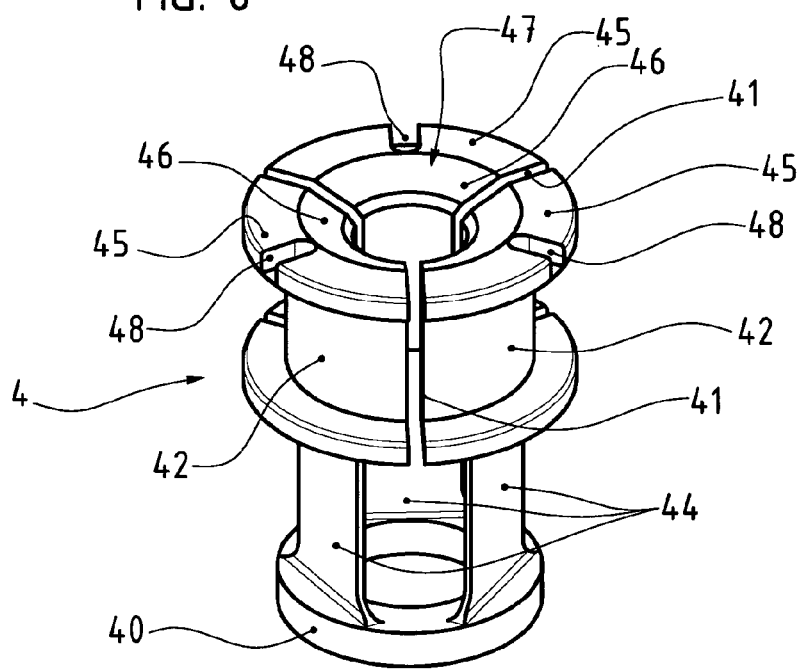
FIG. 6 represents a schematic and perspective view of part of another variant of the same fixing device.

When referring to FIGS. 1 and 2, one can see a first embodiment of the fixing device according to the invention, which comprises a holding element 1 aimed at being made integral with a first object, not shown, and retaining means 2 aimed at being made integral with a second object, also not shown.

This fixing device according to the invention is used to firmly connect the first and second objects, then to permit to separate them from each other when this is wanted.

The retaining means 2 have the general form of a tube comprising, at one end, a plate 24 perforated with holes 27 permitting to fix it to the second object, while its other end includes longitudinal slots 28 that create peripheral parts 20 each connected to the plate 24 by means of an elastically deformable segment 21 permitting the peripheral parts 20 to be able to separate from and coming close to each other.

It should be noted that the retaining means is preferably shaped so that the segments 21 have spring qualities that promote the restoring of the parts 20 in the direction of separation.

In FIG. 1, one can see that the peripheral parts 20 are maintained close to each other and tightened onto the free end 10 of the holding element 1 by winding a link 3 around them, the ends 30 and 31 of this link 3 being maintained tensioned, at least one of them being connected to a mechanism, not shown, for maintaining and releasing this tension, while the other one can be connected to an identical mechanism or be made integral, directly or indirectly, with the second object.

It should be noted that the free end 10 of the attaching element 1, clamped by the parts 20, as well as the inner profile of the latter are configured so as to permit the retaining. Thus, the end 10 can for example consist of an outer thread, while the parts 20 have threads coinciding with this outer thread, so as to form an inner thread when these parts 20 get close to each other.

It should also be noted that the assembled parts 20 are advantageously shaped externally like a reel, thus facilitating the winding of the link 3.

In FIG. 2, one can see that releasing the tension exerted on the link causes the release of the tension it exerts on the parts 20, which, due to the elastic restoring properties of the segments 21, separate from each other in order to permit to release the holding element 1, not shown.

One understands that the fixing device according to the invention is thus of a simple design and can perfectly be made of very small dimensions. Furthermore, there exists no risk, after the release, that some of the elements it is comprised of will escape.

When referring to FIGS. 3 and 4, one can see that, according to a particular embodiment, the end 10 of the holding element 1 is in the form of a sphere, while the parts 20 are shaped so as to re-constitute, after getting close to each other, a spherical cavity 22 capable of accommodating the end 10 and of permitting a certain mobility in pivoting of the holding element 1 with respect to the retaining means 2.

When referring now to FIG. 5, one can see that, according to another embodiment, the parts 20 are connected to the plate 24, each by means of an arm 23 that has flexibility characteristics. The arms 23 have a globally elongated shape and are converging towards a point of the main axis of the retaining means 2.

Each of these arms 23 is designed so as to have certain flexibility in flexion while preserving a high rigidity in traction.

Thus, each of the arms 23 is connected to a part 20 by means of a link 25 and to the plate 24 by means of a connection 26, the connections 25 and 26 being of the knee-joint type, or pivoting according to tangent axis pivots.

In this case the holding element 1 is also movable in several directions, because of the possibility of deformation of the retaining means 2.

When referring now to FIGS. 6, 7a, 7b, 7c, 8 and 9, one can see a preferred embodiment of the fixing device according to the invention.

FIG. 6 represents the retaining means 4 of this preferred embodiment, which has substantially the features of the retaining means 2 of the fixing device of FIGS. 1 and 2.

Thus, the retaining means 4 has a tubular shape; it includes at one end a plate 40, partial longitudinal slots 41 that create, at the other end, three peripheral portions 42 defining a retaining inner cavity 43 aimed at receiving the free end of a fixing element, not shown, and each connected to the plate 40 by means of an elastic segment 44 that has spring properties for restoring the peripheral portions 42 at a distance from each other. Furthermore, the peripheral portions 42 are also configured externally, when brought close to each other, in the form of a reel, so as to promote the maintaining of the winding-up of a link, not shown.

It should be noted that the plate 40 is not provided with holes for its fixing to an object; indeed, as described below, the plate 40 is aimed only at connecting the elastic segments 44.

Each of the three peripheral portions 42 includes at its end, i.e. on the side of the retaining means 4 opposite the one comprising the plate 40, a face 45 extending in a plane perpendicular or substantially perpendicular to the main axis of the retaining means 4, in which a recess 46 is provided for, on the side in front of this main axis, configured so that, when the peripheral portions 42 are maintained close to each other, clamped onto the holding element, not shown, the set of recesses 46 forming a central cavity 47 in the form of a spherical cap.

On the other hand, each of the peripheral portions 42 includes in its face 45, external to the recess 46, a notch 48, the three notches 48 being angularly spaced apart by 120°.

Figure 7A:
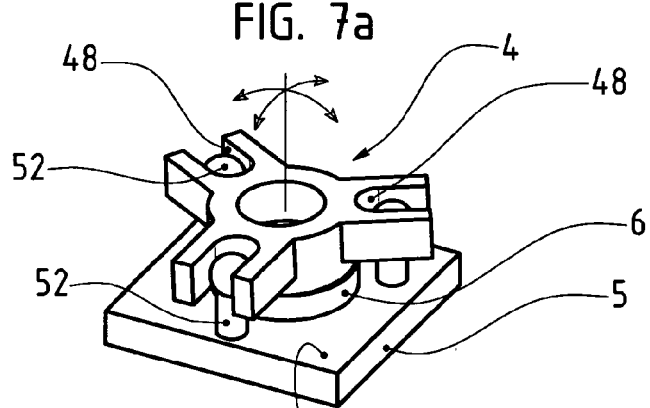
FIG. 7a represents a partial schematic and perspective view of a mounting showing the principle of use of the embodiment shown in FIG. 6.
Figure 7B:
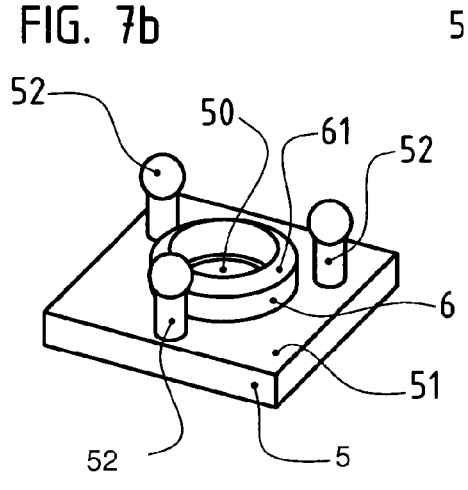
Figure 7C:
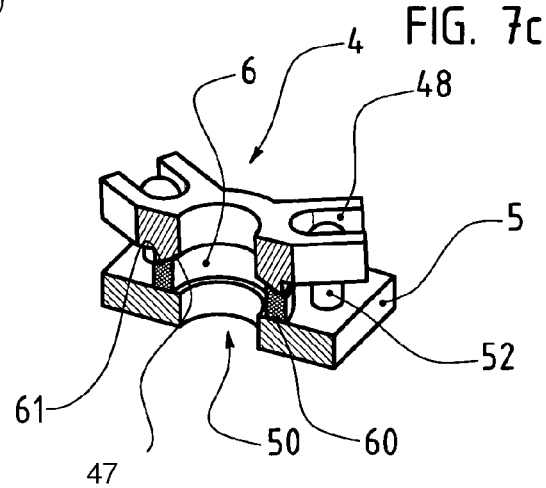
FIG. 7c represents a cross-sectional view of the same mounting of FIGS. 7a and 7b.

When referring now to FIGS. 7a, 7b and 7c, one can see diagrams showing the operating principle of a part of the retaining means 4, namely as regards the cavity 47 and the notches 48.

In these figures is shown a base 5, perforated with a central hole 50, and from the upper face 51 of which protrude three studs 52 arranged coaxially to the hole 50 and angularly spaced apart by 120°. In FIGS. 7a and 7c is also shown an element representing the end of the retaining means 4, in particular the cavity 47 and the notches 48.

Thus, the retaining means 4 is associated with the base 5, each of the studs 52 being inserted into a notch 48, while a washer 6 is intercalated between the base 5 and the retaining means 4, concentrically to the hole 50, the washer 6 comprising a flat lower edge 60 aimed at entering into contact with the upper face 51, and an upper edge 61 shaped into a portion of a sphere so as to be capable of forming a congruent association with the cavity 47.

One will understand that because of the cooperation of the studs 52 with the notches 48, the retaining means 4 is immobilized in axial rotation with respect to the base 5, and that because of the spherical connection between the cavity 48 and the edge 61, it can pivot with respect to the base 5. Such architecture thus permits to bring about a connection with two degrees of freedom likely to withstand a large axial force.

Figure 8A:
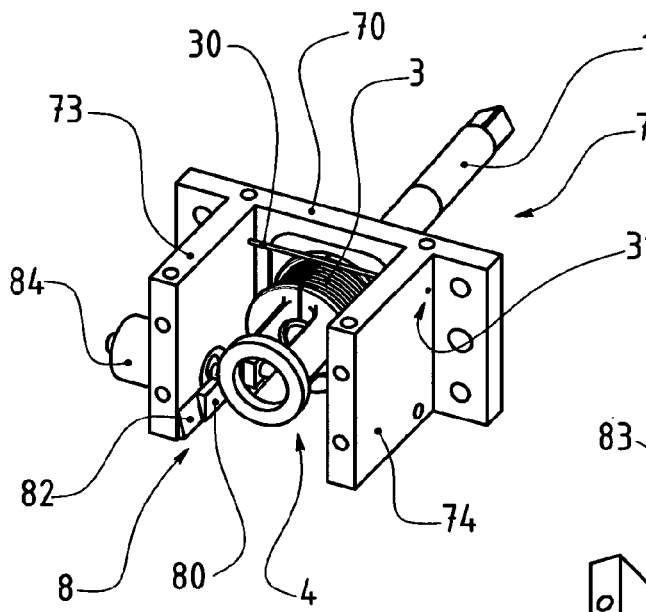
FIGS. 8a and 8b represent schematic and perspective views, according to different angles, of a fixing device according to the invention, using the part shown in FIG. 6.
Figure 8B:
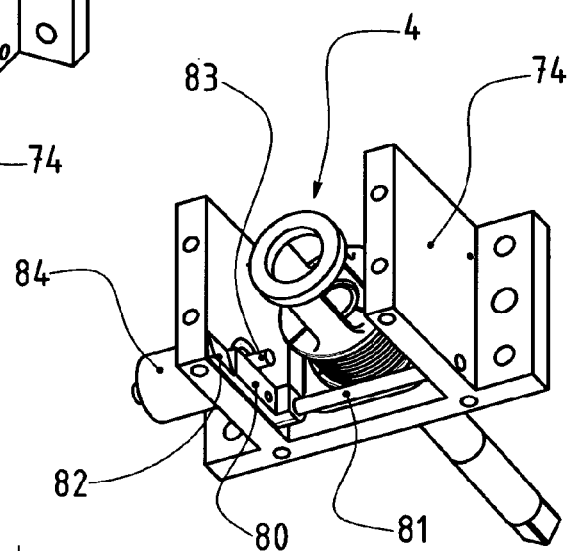
Figure 9:
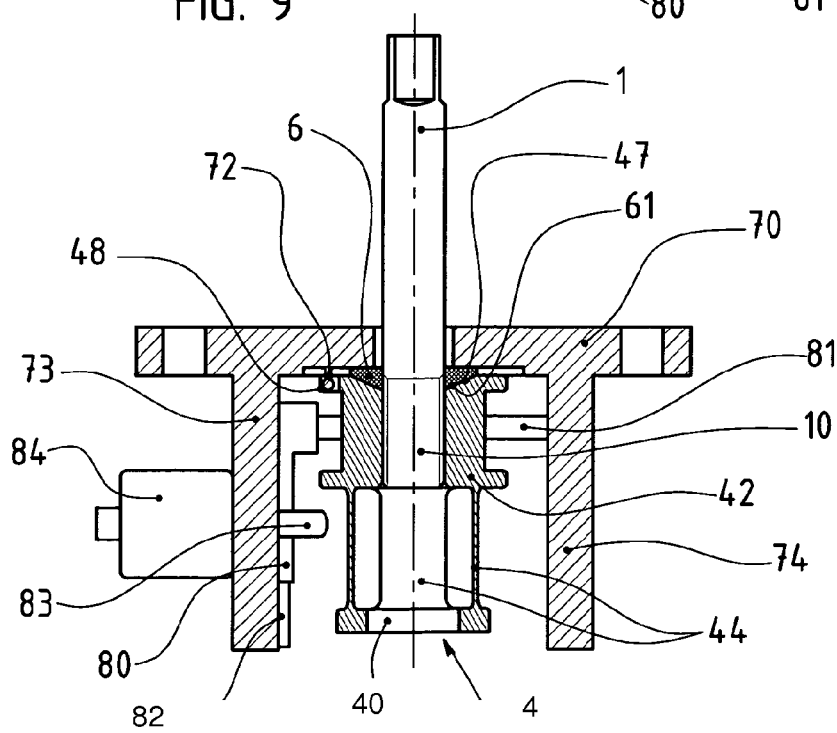
FIG. 9 represents a partial schematic view of the same fixing device of FIGS. 8a and 8b.

When referring now to FIGS. 8a, 8b and 9, one can see a complete fixing device according to the invention.

It comprises a frame 7 aimed at being made integral with one of the objects to be assembled, a holding element 1 aimed at being made integral with another one of these objects, retaining means 4, a link 3, and a mechanism 8 for maintaining and releasing this link 3.

The frame 7 comprises a wall 70 perforated with a hole 71, visible in FIG. 9, through which the holding element 1 passes with a backlash so as to cause to protrude, on the other side, the wall 70 of the end 10, which is inserted into the retaining inner cavity 43 of the retaining means 4. It should be noted that, in this embodiment, the end 10 of the holding element is preferably threaded, while the retaining inner cavity 43 forms, after bring the peripheral parts 42 close to each other, a threaded hole.

As can be seen in FIG. 9, the retaining means 4 rests against the wall 70 through a washer 6 the upper edge 61 of which, shaped into a portion of a sphere, is inscribed in the cavity 47, while the notches 48 are each adapted onto a stud 72, whereby the studs 72 can consist of pins implanted in the wall 70.

The frame 7 also comprises two parallel 73 and 74 extending perpendicular to the wall 70, on both sides of the hole 71 and, hence, of the retaining means 4.

The link 3, visible in FIG. 8a, is wound around the peripheral portions 42 of the retaining means 4, so as to immobilize the holding element 1, the end 31 of the link 3 being made integral with the wall 74, while its end 30 passes through the wall 73 and a certain tension is applied to same.

The fixing element 1 and the retaining means 4 are thus made firmly integral, while permitting an oscillation because of the cooperation of the washer 6 with the cavity 47.

The mechanism 8 comprises a knife 80 mounted movable in swiveling on the wall 73, restored by a torsion spring 81, and the blade 82 of which has a path intersecting perpendicularly the axis of passing through of the link 3, the knife being maintained in stand-by position by the finger 83 of an electromagnet 84.

At the withdrawal of the finger 83, the knife 80 is released and cuts the links 3, causing the pressure exerted on the peripheral portions 42 of the retaining means 4 to be released, which, under the action of the segments 44, separate from each other in order to release the holding element 1.

When referring now to FIGS. 10, 11a and 11b, one can see another embodiment of the fixing device according to the invention, the advantageous feature of which is located at the level of the pre-tensioning means. In these figures, the retaining means 4 have, non-exclusively, the features of the one shown in FIGS. 6, 8a, 8b and 9, this could namely be another embodiment of this retaining means.

Thus, in these figures one can see that the link 3 is in the form of a ribbon 32, or strip, made out of metal, such as steel or a bronze-beryllium alloy, or a composite material, which can be textile, and spirally-wound onto itself, in order to form a spring. This ribbon 32 includes at its end 33, on the inner side of the winding, attaching means 34, while one of the separable parts 42 of the retaining means 4 includes indentations 49 aimed at accommodating these attaching means 34, in order to permit to make this end 33 integral, the outer end 35 of the ribbon 32 being shaped so as to permit to attach it to tensioning means by means of a breakable link 36 likely to be broken by the release mechanism, not shown.

Preferably, the spirally-wound ribbon 32 has, in resting position, an inner diameter slightly larger than the outer one of the pulley formed by the separable parts 42. In operation, a pulling force onto the end 35 of the ribbon 32 causes the separable parts 42 to get close to each other and, hence, the maintaining of the holding element, not shown. When the end 35 is released, the ribbon 32 takes its initial form, which permits the separation of the separable parts 42.

This embodiment has numerous advantages. Thus, the friction on the successive layers of the ribbon 32, when it is in closed position, participates to the mechanical strength of the spring it forms, and thus reduces to the same extent the force required for maintaining same with the breakable link 36. The release of the holding element occurs so as not to require external energy, since the ribbon 32 naturally returns into the open position. Finally, when the ribbon 32 is released, there exists no risk of creating a knot, or of blocking the operation of the retaining means 4, while this could happen with a link of another kind.

When referring to FIG. 12 one can see a variant of the same device, in which the maintaining and release mechanism 8 comprises an electromagnet 85 controlling a trigger 86 movable in displacement according to an axis X parallel to the main one of the retaining means 4, and capable of immobilizing the ribbon 32 in unwinding, which includes to this end, at its free end 35, a hook 37, while its other end includes, as can be seen in FIG. 13, attaching means 34 positioned in an indentation 49 provided for in one of the separable parts 42 of the retaining means 4.

The release is achieved by the withdrawal of the trigger 86. As already mentioned above, the ribbon 32, in so far as it is wound into a sufficient number of layers, is almost self-blocking, i.e. the required maintaining force remains negligible.

When referring now to FIGS. 14a, 14b and 14c, one can see the same embodiment provided with more means permitting the resetting after the release.

Thus, this device includes retaining means 4 comprising separable parts 42 retained by a link 3 that is in the form of a ribbon 32, and associated with a maintaining and release mechanism 8 comprising an electromagnet 85 controlling a movable trigger 86.

In addition, like for the embodiment shown namely in FIG. 6, the faces 45 of the peripheral portions 42 include notches 48 aimed at cooperating with studs, not shown.

In this embodiment, the notches 48 are in a larger number, in this case three per face 45, and have a particular shape, i.e. they are teeth-shaped, each having essentially two sides, one 480 arranged in a substantially radial plane, the other one 481 according to an inclined plane joining the base of a side 480 with the plane of the face 45, so as to provide the faces 45 with a pawl-shape. The faces 45 include, in addition, a notch 460 in each recess 46, the whole forming a driving indentation.

In FIG. 14*a* one can see retaining means 4 after the release, the trigger 86 being in a position withdrawn into the electromagnet 85. In FIG. 14*b*, the trigger 86 is brought back into an advanced position, while in FIG. 14*c* the retaining means 4 is driven in rotation in the direction R, opposite to that of winding-up of the ribbon 32, and through the indentation formed by the notches 460, so that the hook 37 abuts against the trigger 86.

The prolonged rotary motion R causes the tightening of the ribbon 32 around the separable parts 42 that get close to each other, the non-return being ensured by the cooperation of the notches 48 with studs, not shown, through the ratchet effect.

It should be noted that the ratchet effect requires a limited axial mobility of the retaining means 4 with respect to the studs, not shown, which is ensured by means of an axial spring, not shown, capable of maintaining the retaining means 4 applied against the spherical washer 6, also not shown.

After resetting, the holding element 1, since the coupling occurs by screwing-in, can be screwed into the retaining means 4, and the fixing device is operative.

The resetting advantageously occurs without dismantling, simply by means of a suitable key, for example, and the number of resetting operations is not limited.

It should be noted that in the embodiment shown the retaining means 4 includes the notches forming a ratchet, but it is also possible, however in a less functional version, to create the notches in the object to be made integral, at the level of the frame 7 for example, while the parts 42 include the studs.

Irrespective of the embodiment of the fixing device according to the invention, the latter has numerous advantages with respect to those that exist today.

In essence, its design permits its miniaturization and permits certain flexibility at the level of the connection.

It permits an assembling of perfect elementary connections bringing about a perfect structural connection with two degrees of freedom.

The orientation of the retaining means 4 and, hence, of the holding element 1, occurs without any additional parasitic effort and this orientation is not limited in amplitude.

The link permitting the maintaining through winding-up can be in several forms, the form of a ribbon being however the most efficient one. Indeed, the retaining means 2 or 4 as proposed permits, through the elastically deformable segments 21 or 44, a simultaneous separation of the separable parts 20 or 42 and, hence, an also instantaneous release of the holding element (1). Furthermore, the ribbon 32 permits, one the one hand, to provide a solid maintaining with least effort and, on the other hand, because of its spring properties, to be capable of instantaneously opening and separating upon release of its end, so as not to hinder the separation of the separable parts 20 or 42. In addition, the ribbon 32 advantageously maintains its spirally-wound shape after the release, so that the whole device remains compact and that no parts or pieces are expelled.

I claim:

1. Fixing device for assembling objects, then quickly releasing them, said fixing device comprising:
a holding element being made integral with one of the objects to be held together; and
retaining means being made integral with another one of the objects to be held together and releasably holding said holding element, said retaining means being comprised of:
a plurality of separable parts held close together by a disengageable pre-tensioning means,
wherein said separable parts are held closely together around a securable part of said holding element, when the objects are held together,
wherein said separable parts are connected to each other through elastically deformable means for restoring said separable parts to a distance away from each other, when the objects are not held together,
wherein the pre-tensioning means comprises an element forming a link being wound around said separable parts so as to maintain said separable parts closed onto said holding element, said element having at least one end fixed to a mechanism for maintaining a tension exerted onto said link, said mechanism for maintaining a tension comprising means permitting tension release, and
wherein said retaining means comprises a clamp comprised of a globally tubular element, said separable parts being comprised of petals with elastic spring properties, said petals being formed by partial longitudinal slots formed in the tubular element, said petals having separable ends when the objects are not held together, said separable ends being held close together around said holding element when the objects are held together, the tubular element being the elastically deformable means for restoring.

2. Fixing device according to claim 1, wherein said securable part of said holding element and said separable parts of said retaining means have complementary profiles.

3. Fixing device according to claim 1, wherein the retaining means further comprises a means for connecting to said another one of the objects, said one of the objects and said another one of the objects having degrees of freedom of movement with respect to another one, said one of the objects and said another one of the objects maintaining a connection in an axial direction.

4. Fixing device according to claim 3, wherein said means for connecting of said retaining means comprises a plate being fixed to said another one of the objects to be assembled, and wherein said elastically deformable means are made integral with said plate through hinged areas.

5. Fixing device according to claim 3, wherein said means for connecting said retaining means is made integral with said another one of the objects through an interface permitting a swiveling motion of said another one of the object with respect to the holding element.

6. Fixing device according to claim 3, wherein said separable parts form a cavity having a shape of a spherical cap, said cavity accommodating said securable part of said holding element, and wherein said means for connecting said retaining means is an interface comprising a washer having an edge shaped so as to pivotally cooperate with said cavity, said interface resting against said cavity and having an opposite edge resting flush with said another one of the objects, said retaining means being made integral with said another one the objects.

7. Fixing device according to claim 5, wherein said interface is comprised of a ratchet system, wherein rotation of said ratchet system in a first axial direction corresponds to rotation of said link in a second axial direction opposite said first axial direction so as to bring said separable parts of said retaining means close to each other.

8. Fixing device according to claim 1, wherein said link is comprised of a ribbon, said ribbon being comprised of one of a group consisting of metal, composite material, and synthetic material, said ribbon being wound onto itself from an inner end to an outer end so as to form a spiral having spring characteristics, said inner end of said ribbon being made integral with one of said separable parts of said retaining means, said outer end of said ribbon being made integral with said mechanism for maintaining a tension said ribbon being wound onto said retaining means and around said separable parts.

9. Fixing device according to claim 8, wherein said maintaining mechanism comprises a trigger with an electromagnet cooperating with said outer end of said ribbon, said outer end of said ribbon being shaped to attach to said trigger.

* * * * *